Aug. 22, 1950 J. NEUFELD 2,520,050

MAGNETIC SOUND RECORDING AND REPRODUCING

Filed Sept. 17, 1945 2 Sheets-Sheet 1

INVENTOR.

Jacob Neufeld

MAGNETIC SOUND RECORDING AND REPRODUCING

Filed Sept. 17, 1945 2 Sheets-Sheet 2

INVENTOR.

Jacob Neufeld

Patented Aug. 22, 1950 2,520,050

UNITED STATES PATENT OFFICE 2,520,050

MAGNETIC SOUND RECORDING AND REPRODUCING

Jacob Neufeld, Tulsa, Okla.

Application September 17, 1945, Serial No. 616,883

7 Claims. (Cl. 179—100.2)

This invention relates to sound recording and reproducing apparatus of the magnetic type commonly referred to as the telegraphones, that is, apparatus in which the record is made on magnetic wire as variations in the magnetization thereof, the wire being unwound from one reel, drawn past recording or reproducing magnets and taken up upon another reel. The wire may be rewound by reversing the drive of the apparatus.

The art of magnetic recording upon movable wire or tape is very old and numerous arrangements for recording speech and music of highest possible quality have been attempted. In general, it is possible to distinguish two fundamental methods of magnetic recording: one involving "longitudinal magnetization" in which the direction of magnetization is substantially parallel to the axis of the movable magnetizable member and the other involving "perpendicular or transverse" magnetization in which the direction of magnetization is substantially perpendicular to the axis of the movable magnetizable member. (See for instance: "Sound Recording on Magnetic Tape" by C. N. Hickman, Bell System Technical Journal, vol. XVI, No. 2, April, 1937 pp. 165-177.)

The earliest attempt of magnetic recording were of the longitudinal recording type in which a magnetizable member of round cross section, namely, a wire was magnetized longitudinally to a varying degree in accordance with the currents of the signal that it was desired to record. Although this method was workable and produced useful results, it was discovered by a number of workers that in order to achieve high quality, it was necessary to run the wire at relatively high speed, as high as 5 to 10 feet per second. Numerous efforts were made to produce an instrument that would involve lower speeds of wire, and in that connection it became apparent that it was necessary to design a recording apparatus capable of magnetizing extremely short section of wire, of the order of only a few thousandths of an inch. During this research work it was discovered that even though only a very short section of the wire was exposed to a magnetic field, a somewhat longer section tended to become magnetized, because the magnetism would spread longitudinally along the wire. Thus, if a magnetic recording head was provided that would record so that only an extremely small portion of length of wire were exposed to the magnetic field, three or four times that length would become magnetized. This phenomenon was identified as "magnetic spreading."

In order to overcome the effects of magnetic spreading, a method of recording transversely was developed. Transversal recording has been heretofore accomplished on a steel ribbon or tape about .001 inch thick and .125 inch wide having its ends secured to suitable winding reels and passing between a pair of recording magnets (see for instance British Patent 389,117 or the aforementioned paper by C. N. Hickman). The pole pieces of the recording magnets were placed directly opposite each other so that the magnetic pattern consisted of variations in the intensity of magnetization, the direction of the magnetization being substantially perpendicular to the surface of the tape, thus producing a transverse magnetization of the tape. In transverse magnetization the flux in the tape is in the direction of its thickness, i. e. it is perpendicular to the axis of the movable tape. In other words, a tape so magnetized may be thought of as a series of elemental magnets .125 inch wide and .001 inch long, as contrasted with a tape longitudinally magnetized by poles spaced along the tape. In case of longitudinal magnetization, the flux in tape is in the direction parallel to the axis of the tape, i. e. the elemental magnets will have a length equal to the distance apart of the spaced magnet poles measured along the longitudinal axis of the tape.

Because of the geometry of the arrangement, the phenomenon of "magnetic spreading" has been substantially eliminated in the transversal magnetic recording upon tape. The method of transversal recording on tape has also gone through a very thorough development, and at the present stage the transversal recording on tape is very much superior in the quality of reproduction to the longitudinal recording on a thin wire.

When comparing the quality that can be achieved with any recording method, it is important to compare the performance for a given speed of the medium on which the record is made. Obviously, it is possible to record higher frequencies by running the apparatus faster, but at a given speed different methods would be capable of recording a different range of frequencies, and for purposes of comparing one method to another it is important to keep this in mind. The best apparatus developed for recording transversely on steel tape is capable of recording frequencies up to 8000 cycles per second for a tape speed of 16 inches per second (see the above referred to article by C. N. Hickman). Whereas, the most highly developed longitudinal recorder requires a wire speed of 75 inches per second in order to reproduce frequencies up to 8000 cycles per second, this represents a very substantial difference, and this difference is mainly due to the fact that, in the one case there was no magnetic spreading longitudinally, while in the other case there was.

Despite this large difference in performance, the magnetic recording apparatus utilizing a thin wire is receiving a wide recognition and is extremely useful, because the mechanical problems in handling wire are very much easier to solve than the mechanical problems in handling a steel tape. Wire can be wound upon a spool comparatively easily with little danger of kinking; whereas, tape requires special guiding mechanism and has to be very carefully layer wound; otherwise, kinking and tangling occurs. Because of these difficulties, the storage reels on which a steel tape is wound usually are considerably larger than the storage reels on which the same length of wire has been wound. This very much greater mechanical convenience for handling wire as compared to tape or ribbon accounts for the fact that wire recorders are in use today despite the fact that the performance that can be achieved with wire recorders for a given speed of wire is very much inferior to that that can be achieved with tape recorders for the same speed of tape. As pointed out above, for a given speed, the wire recorders are about one-fourth as good as the tape recorders. However, the handling of the wire is so much easier and, therefore, this compensates for this factor of four and makes the wire recorder still competitive.

It is apparent, therefore, that great advantage could be derived from an instrument that would combine the merits of wire recording with the merits of tape recording, or transversal recording. In this case the mechanical convenience of handling a member having round cross section would be retained, and at the same time, the advantages of slow speed for a given quality would be retained.

Whereas, it is preferably feasible to record transversely on wire with the same faithfulness that it is possible to record transversely on ribbon, the reproducing problem is very much complicated by the fact that the wire twists, and that at certain times during the reproducing process the magnetism on the wire is directed in a direction such, that the pickup device responds very unfavorably. In fact, under certain conditions, the magnetism in the wire can be oriented accidentally exactly at right angle to the direction for which the reproducing device is set, in which case the reproduction will be completely absent, i. e., the pickup device will not respond to the magnetization of the wire and will produce zero voltage. One of the reasons, in fact, for employing steel tape instead of wire is to prevent the twisting, the steel tape being held mechanincally between proper supports which present it to the reproducing head always in a given orientation. Because of the round cross section of the wire it is not possible to hold the wire always in one position and twisting is absolutely unavoidable. Numerous efforts have been made to get around this difficulty, but without success, because it is impossible to design a reproducing head that will uniformly respond to the transverse magnetism in the wire, irrespective as to whether the twisting of the wire takes place or not. No matter what kind of a magnetic circuit is employed, there always appears to be an angle in the orientation of the magnetism of the wire at which the reproducing device will give zero response. When the wire twists through the range that comprises this orientation, the reproduction is totally absent and only the noise due to the magnetic irregularities of the wire remains.

This invention describes a means for picking up transverse magnetism in the wire irrespective of orientation. The principle consists in providing a pair of pickup magnetic circuits or coils set at right angles one to another, so that when the voltage picked up by one coil is zero, the voltage picked up by the other is maximum. Consequently, one of the pick up coils will be at all times responsive to the transverse magnetism of the wire, irrespective of the orientation of the wire cross section with respect to the pole pieces of the reproducer. By providing this arrangement, it is possible to combine all the advantages of recording upon a thin wire, such as ease of handling, cheapness, the general availability of the very long stretches of wire, etc. with all the advantages of recording upon a tape, such as high quality per unit of speed. Consequently, the present invention represents considerable advantage over the art, because it makes it possible to employ now wire recording and run the wire at a speed of only one-fourth the speed that was necessary previously for the same results.

In accordance with a specific feature of this invention, the record is made on a very thin slowly moving magnetic wire having high magnetic retensivity by employment of transverse magnetization. The transverse magnetization is induced by means of pole pieces contacting or nearly contacting either side of the wire, the pole pieces being made of laminations of magnetic material of high magnetic permeability, high resistivity and very low retentivity, and being tapered on one end so that the portion adjacent to the wire is in the form of a very thin lamination perpendicular to the axis of the wire.

A shortcoming of magnetic sound recording methods and apparatus as known heretofore has been that, in order to secure recordation of all of the desired frequencies, the magnetic recording wire had to be driven at such high speed that it was not possible to make a continuous recording of a desirable duration on a convenient length of the recording wire or tape.

It is accordingly a primary general object of the present invention to provide a magnetic recording machine and method, in accordance with which a recording of comparatively long duration may be made on a recording element of a normal or convenient length.

Other objects and advantages of the invention, will be apparent from the following specification when taken with the accompanying drawings in which.

Figure 1:
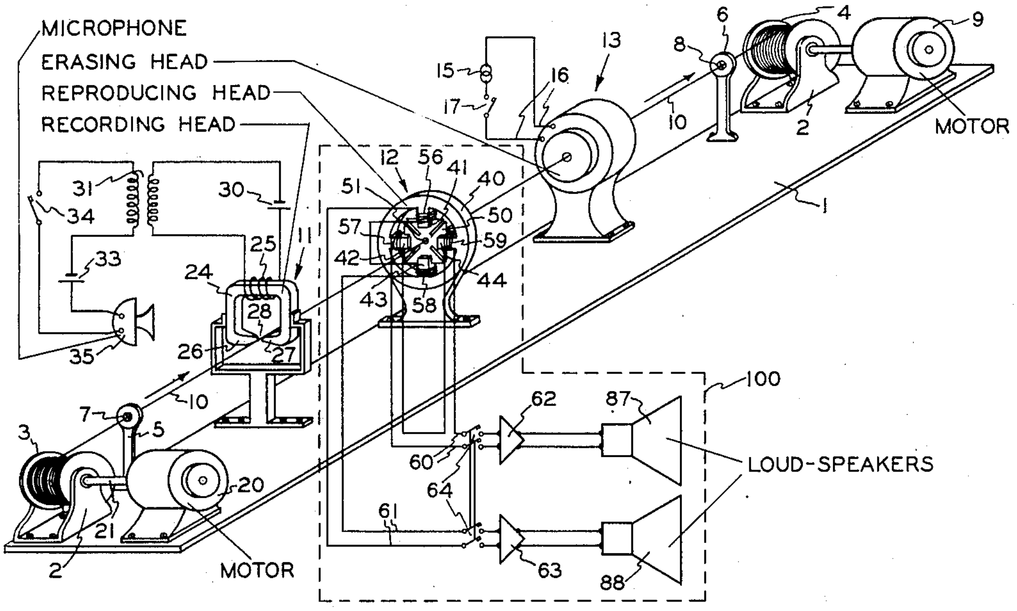
Fig. 1 is a diagrammatic view of a recording and reproducing apparatus showing means for making a record upon a movable wire, means for erasing the record from the wire, and means for effecting the reproduction of speech from the record.

The apparatus shown in Fig. 1 is provided with a supporting base 1, bearing members 2, and spools 3, 4 which are journalled in these bearing members. Upright guide members 5 and 6 are provided and these guide members are provided respectively with slots 7, 8 for the passage of the recording wire. At the commencement of a recording operation a spool of wire 3 is provided, the spools 3 are kept in stock and are ready for operation. The wire 10 is drawn off of the spool 3 and wound upon the spool 4 by any suitable motive power such as the motor 9. When the wire is passing from the spool 3 to be wound on spool 4, it is drawn through slot 7 in upright member 5 and it passes a series of electromagnetic devices. The first electromagnet 11 is provided for recording magnetically sound upon the wire and is designated as "recording head." The second electromagnet 12 is provided for reproducing sound from the magnetic recordings on the wire, and is designated as "reproducing head." The third electromagnet 13 is provided for the purpose of erasing the magnetic recordings from the wire, and is therefore designated as "erasing head."

In order that a record may be erased from the wire, the electromagnet 13 is supplied with current from a source 15 by means of conductors 16. A switch 17 is also provided to complete the circuit at will. When current is supplied to the electromagnet 13, the wire passing between the poles is left in a uniform and demagnetized condition.

The wire 10 is moved in the direction indicated by the arrow, regardless whether a record is to be made or if a record is to be reproduced. For instance, in cases that almost the entire corded wire has been wound on the spool 4, a back winding thereof to the spool 3 is necessarily required before the reproduction of this record or records can be commenced. This backwinding is accomplished by means of a motor 20 adapted to drive the spool 3 through the shaft 21.

The recording head 11 consists of an electromagnet having an iron core 24 and a winding 25 wound around the core 24. The core 24 is provided with two pole pieces 26 and 27, immediately adjacent one to another. The pole pieces are provided with sharp edges in form of knife blades in order to localize within a narrow zone of exploration the flux that passes between them. The narrow air gap between the pole pieces 26, 27 is designated by 28. The wire 10 is made to pass through the air gap 28 in such a manner, that the axis of the wire is perpendicular to the line joining the pole pieces 26 and 27. The winding 25 is connected through the battery 30 to the secondary winding of the transformer 31, the primary winding of which is connected through the battery 33 and the switch 34 to the microphone 35.

Figure 2:
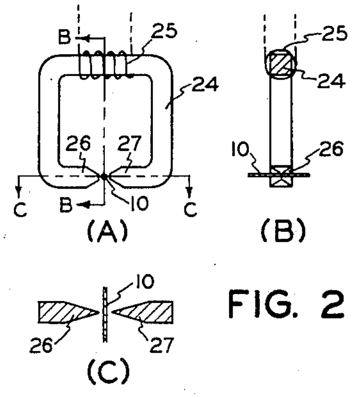
Fig. 2 shows diagrammatically the front and cross sectional views of an element of the apparatus that is used for effecting recording only.

Fig. 2 shows diagrammatically the front view and two cross sectional views of the recording head 11. In particular, Fig. 2A shows the front view, Fig. 2B shows the cross section through a plane passing through the axis of the wire and perpendicular to the line joining the pole pieces 26, 27 and Fig. 2C shows the cross section through a plane passing through the axis of the wire and the line joining the pole pieces 26, 27.

It is apparent that as the wire 10 is moved in the direction of the arrow, as described above, it is brought to a very high transverse magnetization by the flux set up between the pole pieces 26, 27. By "transverse magnetization" it is meant that the flux in the wire is in the direction of its thickness, i. e. it is perpendicular to the axis of the wire. In other words, a wire so magnetized may be thought of as a series of elemental magnets directed transversely to the axis of the wire, as contrasted with a wire longitudinally magnetized by poles spaced along the axis of the wire.

In the arrangement disclosed, the pole tips 26, 27 are very close, but not actually in contact with the wire, although in some instances an actual contact can be realized. An appreciable separation of the pole tips will, of course, materially reduce the efficiency of the system.

Figure 3:
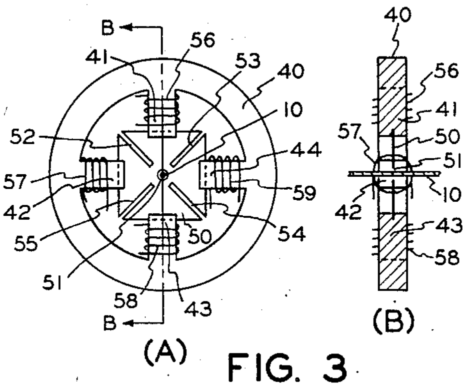
Fig. 3 shows diagrammatically the front and a cross sectional view of an element of the apparatus that is used for effecting reproduction only.

The reproducing head 12 is shown diagrammatically in Fig. 3. In particular, Fig. 3A shows the front view of the reproducing head and Fig. 3B shows the cross section through a plane passing through the wire 10 and through a line joining the pole pieces. The reproducing head 12 consists essentially of a ferromagnetic ring 40 with four protruding pole pieces 41, 42, 43, 44 directed towards inside of the ring, and of a thin ferromagnetic diaphragm 50 located in the central portion of the ring 40 and rigidly set into the pole pieces 41, 42, 43, 44. The diaphragm, pole pieces, and ring are all designed to be an integral unit. The diaphragm 50 is provided with a hole 51 just barely large enough to pass the wire 10 through the diaphragm, and is provided with diagonal cuts 52, 53, 54, 55. The purpose of the diagonal cuts is to produce a high reluctance path from one section of the diaphragm to another, and to help guide the magnetic lines through the pole pieces, and prevent it from short circuiting by the presence of a continuous ferromagnetic path. The pole pieces 41, 42, 43, 44 are provided with coils 56, 57, 58, 59, respectively. Coils 56, 58 are connected in series and coils 57, 59 are connected in series. These two pairs of coils are brought up to the lead wires designated as 60 and 61, respectively.

The outputs derived from the lead wires 60, 61 are respectively fed into conventional amplifiers 62, 63 through switch mechanism 64 and are respectively applied to the loudspeakers 87 and 88.

It shall appear obvious in the subsequent description of my invention that when the magnetized wire 10 during its motion in the direction of the arrow, passes through the opening 51, the coils 56, 58 and 57, 59 will respond to the varying magnetic field derived from the motion of the magnetized wire 10 and will produce two voltages across the windings of these coils, that are substantially proportional to the rate of change of the magnetic flux. These two voltages will be derived from each of the pairs of coils 56, 58 and 57, 59 and will be applied across the leads 61 and 60, respectively. It is apparent that the magnitude of each of these two voltages will depend upon the orientation of the magnetism of the wire with respect to the pole pieces of the reproducing head 12, and since the wire twists, the magnetism of the wire may be directed in such a manner that one of the two pairs of coils 56, 58 and 57, 59 may respond very unfavorably. In fact, under certain conditions, the magnetism in the wire can be directed accidentally exactly at right angles to the axis of one of the pairs of coils, say to the pair of coils 56, 58. In this case the voltage generated by the coils 56, 58 will be zero because there are no flux linkages between the magnetic flux produced by the wire 10 and the coils 56, 58. However, at the same instant, the flux linkages between the magnetic flux produced by the wire 10 and the coils 57, 59 is at maximum because the magnetism of the wire will have the same direction as the axis of the coils 57, 59. Consequently, the voltage generated by the coils 57, 59 will be maximum. It is therefore apparent that, because of the twisting of the wire, the magnitude of the response of the coils 56, 58 and 57, 59 will continually vary and at any instant will be dependent upon the orientation of the magnetism of the wire with respect to the axis of the coils 56, 58 and 57, 59. Consequently, the two voltages derived from the coils 56, 58 and 57, 59 will be applied across the leads 61 and 60, respectively, and will have magnitudes depending upon the orientation of the magnetization of the wire (representing the speech signals) with respect to the axis of the coils 56, 58 and 57, 59, respectively. More particularly, each of these two voltages will have a magnitude representing the directional component of the speech signals impressed magnetically upon the wire 10, the said directional component being referred to the axial direction of the coils 56, 58 and 57, 59, respectively.

Consequently, we obtain across the leads 61 and 60, respectively, two voltages, each of said voltages representing the response of the corresponding pair of coils (56, 58 or 57, 59) to the varying magnetic field derived from the motion of the magnetized wire 10. It is apparent that each of these two voltages will represent the facsimile of the speech signals impressed magnetically upon the wire and, consequently, these two voltages will vary with respect to time in a substantially similar manner. The only difference between the voltages across the leads 60 and 61, is the difference in intensity, since the intensity depends upon the orientation of the magnetism of the wire with respect to the axis of the coils 56, 58 and 57, 59, and because of the twisting of the wire, this orientation varies.

If, for instance, the orientation of the magnetism of the wire 10 is such as to make an angle of 45 degrees with the axis of the coils 56, 58, and 45 degrees with the axis of the coils 57, 59, then the signals derived from the leads 60 and 61 are equal in intensity. If, however, the orientation of the magnetism of the wire 10 is such as to make a smaller angle with the axis of the coils 56, 58, than with the axis of the coils 57, 58, the signal derived from the leads 60 is weaker in intensity than the signal derived from the leads 61. Since, because of the twisting effect, the orientation of the magnetism continually varies, the relative intensities of the signals derived from the leads 60 and 61 vary in relationship to the twisting motion of the wire.

The leads 60 and 61 are connected to loud-speakers 87 and 88 through the amplifiers 62 and 63, respectively. The loud-speakers are of conventional design and adapted to translate the electrical energy derived from the leads 60 and 61 into acoustical energy that is radiated into space.

When the device is in operation, the coils 57, 59 and 56, 58 are arranged to respond continuously to the magnetism of the wire and to produce the two component electrical signals applied to leads 60 and 61, respectively. It is also apparent that as the wire twists, there are some orientations of the magnetism of the wire which cause either of the two component signals to be zero. There is, however, no orientation of the magnetism of the wire 10 which would cause both component signals to be zero simultaneously, since at the instant when one component signal is zero, the other is maximum. The component derived from the leads 60 is radiated in form of acoustical power by the loud-speaker 87 and the component derived from the leads 61 is radiated in form of acoustical power by the loud-speaker 88. The total acoustical power thus generated is equal to the sum of acoustical powers generated by the loud-speakers 87 and 88.

Figure 4:
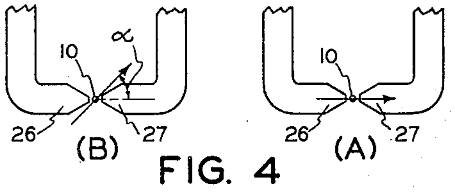
Fig. 4 shows certain geometrical relationship between the wire and the pole pieces of the recording electromagnet during the process of recording.

Consider now more in detail the operation of the arrangement of Fig. 1, as a recorder and as a reproducer. The operation is controlled by three switch units designated by numerals 17, 34 and 64. When it is desired to impress sound upon the wire 10, the switch 17 controlling the erasing head 13 and the switch 64 controlling the reproducing head 12 are open, and the switch 34 controlling the recording head 11 is closed. The wire is assumed to be wound upon the spool 4 and the motion of the wire in the direction indicated by the arrow is produced by unwinding the wire from the spool 3 and winding it upon the spool 4. Sound waves are arranged to impinge upon the diaphragm of the microphone 35 and cause motions in the electrodynamic transducing mechanism which generate electrical currents that are representative of the sound waves. The speech currents are transmitted through the transformer 31 to the winding 25 and produce in the air gap 28 separating the pole pieces 26, 27 a magnetic flux which is a reasonably exact facsimile of the sound waves that impinge upon the diaphragm of the microphone 35. Before the wire enters into the air gap 28, it is assumed to be in demagnetized condition. It is apparent, that an extremely small portion of the wire which at a given instant is in the direct neighborhood of the pole pieces 26, 27 becomes magnetized in the direction perpendicular to the axis of the wire and to the extent dependent upon the strength of the magnetic flux at the instant under consideration. Therefore, after this portion of wire has left the air gap and proceeds in the direction of the arrow towards the spool 4, a subsequent portion of the wire enters the air gap and becomes subsequently magnetized in the direction perpendicular to the axis of the wire and to the extent dependent upon the strength of the magnetic field in the air gap at said subsequent instant. Because of the magnetic retentivity, each element of wire, after having passed through the air gap acquires a magnetic moment which is vectorially located in a plane perpendicular to the axis of the wire and the direction of which is determined by the position of the pole pieces 26, 27 with respect to the cross section of the elemental wire at the instant it was subjected to the magnetic field. The geometric relationship showing the direction of the magnetic force with respect to the position of the pole pieces and the cross section of the wire at the instant of magnetization is shown in Fig. 4A.

It is therefore apparent that, as the wire 10 moves in the direction of the arrow and becomes wound upon the drum 4, it acquires and retains a succession of magnetic moments directed transversely to the length of the wire and representing the speech currents applied to the air gap 28. In order to reproduce the speech thus stored upon the wire, a back winding upon the spool 3 is necessary by means of the motor 20. Subsequently, the wire is being moved again in the direction of the arrow and the unwinding motion of the drum 3 recommences.

We shall show at present that the magnetic structure represented by the head 11 can be used for recording of signals only, and cannot be used for the reproduction of the magnetic impressions from the moving wire 10. It is apparent that when the magnetized section of the wire passes again through the air gap 28 of the electromagnet 11, the relative position of the retained magnetic moment with respect to the pole pieces 26, 27 is not any more the same as shown in Fig. 4A. Because of the twisting of the wire during its winding and unwinding motion, the cross section of the element of the wire that repasses through the air gap 28 does not occupy an identical position to the one during the instant of magnetization. The direction of the magnetic moment vector is usually inclined with respect to the axis joining the pole pieces by an angle that may be designated as $\alpha$ as illustrated in Fig. 4B. Consequently, the amount of flux interlinking with the coil 25 that is caused by the magnetic moment of the elemental wire depends upon the value $\alpha$, where $\alpha$ indicates the relative value of twist, i. e. the change in angular displacement of the elemental section of wire at the instant it repasses through the air gap 28 as compared to the reference value of the angular displacement of the same section of wire at the instant at which the magnetic impression was made. When $\alpha=0$ or when $\alpha=180°$, the magnetic flux derived from the wire and interlinking with the coil 25 is maximum, when $\alpha=90°$ or $\alpha=270°$, this flux is zero, and for any intermediate values of $\alpha$ this flux is between a maximum and zero. Consequently, the electromagnet 11 cannot be used for purposes of reproducing the signal impressed magnetically upon the moving wire 10, since, for some angular positions caused by the twisting of the wire, there is no flux interlinking with the electromagnet 11, and, therefore, the electromagnet does not respond at all to the signal impressed upon the wire.

Therefore, in order to reproduce the signal impressed magnetically upon the moving wire 10, the switch 34 is open in order to render the recording head 11 inoperative, and the switch 64 is closed, thus permitting the magnetized wire to energize the reproducing head 12.

Figure 5:
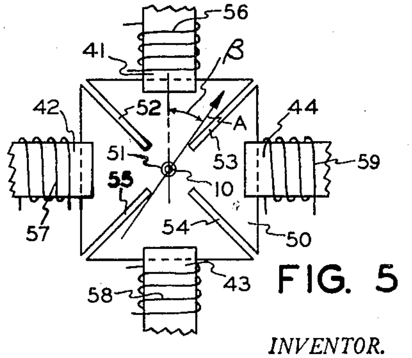
Fig. 5 shows certain geometrical relationship between the wire and the pole pieces of the reproducing electromagnet during the process of reproducing.

The reproducing head 12 consists of two pairs of pole pieces 41, 43 and 42, 44 arranged at 90 degrees one with respect to another. Consider now the succeeding elemental sections of wire that traverse the opening 51 of the ferromagnetic diaphragm 50 of the reproducing head. Each of these sections will act as a small magnet and will supply a magnetic flux traversing the diaphragm 50, the pole pieces and the circular ring 40. It is therefore apparent, that the pair of pole pieces 41, 43 and the pair of pole pieces 42, 44 will each supply a convenient magnetic path for the changing flux resulting from the passage of the magnetized wire, and cause this flux to interlink with the associated coils. This changing flux generates two voltages in the pair of coils 56, 58 and in the pair of coils 57, 59, respectively, the magnitudes of these voltages depending upon the interlinking of the magnetic flux caused by the moving wire and the associated coils. Assume a more specific case in which the wire 10 passes through the hole 51 of the reproducing head. Let the relative position that the cross section of the wire occupies with respect to the pole pieces be the one shown in Fig. 5. As shown in Fig. 5, the magnetic vector of the elemental section of the wire has a direction represented by an arrow A and forms an angle $\beta$ with the line joining the pole pieces 41, 43 and angle $(90-\beta)$ with the line joining the pole pieces 42, 44. It is apparent that when $\beta=0$ or $\beta=180°$ the magnetic flux created by the wire and interlinking with the coils 56, 58 is maximum, whereas the magnetic flux interlinking with the coils 57, 59 is zero. On the other hand, when $\beta=90°$ or $\beta=270°$ the magnetic flux interlinking with the coils 56, 58 is zero and the magnetic flux interlinking with the coils 57, 59 is maximum. For intermediate values of $\beta$ the magnetic flux interlinking with coils 56, 58 is proportional to cos $\beta$ and the magnetic flux interlinking with the coils 57, 59 is proportional to sin $\beta$.

The essential and fundamental feature of my invention consists in deriving by means of the reproducer 12 acoustical power that is substantially proportional to the magnitude of the magnetic effect stored in the elemental section of the wire, and that is substantially independent of the angle $\beta$. Such acoustical power is obtained by separately translating into acoustical energy the two pick-up signals that are derived from the coils 57, 59 and 56, 58 and that are applied across the leads 60 and 61, respectively. These signals are radiated acoustically by means of loud-speakers 87 and 88, and provide a total radiation equal to the sum of the radiant energy derived from said loud-speakers.

The above arrangement involving separate loud-speakers has the purpose of preventing complete cancellation of the signals derived from the coil pairs 56, 58 and 57, 59, respectively. Should, for example, the outputs of the amplifier 62 and 63 be connected directly additively then there would be an orientation of the magnetism in the wire which would generate equal and opposite signals in each coil pair, and consequently complete cancellation of the outputs of amplifiers 62 and 63 would occur. The employment of two separate loud-speakers, such as the loud-speakers 87, 88, overcomes this difficulty since each loud-speaker cannot be considered as a point source of sound and since the listener's ears receive the sound from the loud-speakers over a multiplicity of paths due to reflections, reverberations, etc. It has been demonstrated in connection with studies of the reproduction of speech and music in auditory perspective that even when one of a pair of loud-speakers is energized in exact phase opposition to the other, cancellation of the sound does not occur and, on the contrary, the power output of one of the loud-speakers always tends to increase the loudness of the total signal generated. The reason for this lies in the fact that (1) the loud-speakers themselves are usually of the same order of dimensions or larger than a wave length of the radiated sound; (2) the spectral composition of sound encountered in speech and music is extremely complex and if phase cancellation does exist for one frequency, phase addition will exist for another frequency, so that the resultant effect of two sound generators causes merely a variation in the smoothness of the response vs. frequency characteristic of the system but does not result in any appreciable cancellation effects; (3) because of reverberations, etc. the ears of the listener receive the sound over a multiplicity of paths and at no time is it possible for all the paths to one loud-speaker to cancel the effects due to all the paths to the other loud-speakers. Thus, it is seen that by an arrangement employing two loud-speakers the previous difficulties due to twisting of the wire are overcome since the arrangement employing two pick-up coil pairs and the dual loud-speakers makes it impossible for the signals caused by the components of the magnetism to cancel one another.

It is now apparent that the loudness of the signal generated by the loud-speakers 87 and 88 is maintained at a substantially constant level during the operation of the device, i. e. the total power is substantially unaffected by the twisting of the wire. As the wire twists, the orientation of the magnetism changes automatically, and under such conditions the two components that are picked up by the pick-up devices are both utilized to separately produce two individual acoustical outputs. These acoustical outputs are jointly radiated into the surrounding space, thus providing a total acoustical output that is at all times responsive to the transverse magnetism of the wire, irrespective of the orientation of the wire cross section with respect to the pole pieces of the reproducer.

Figure 6:
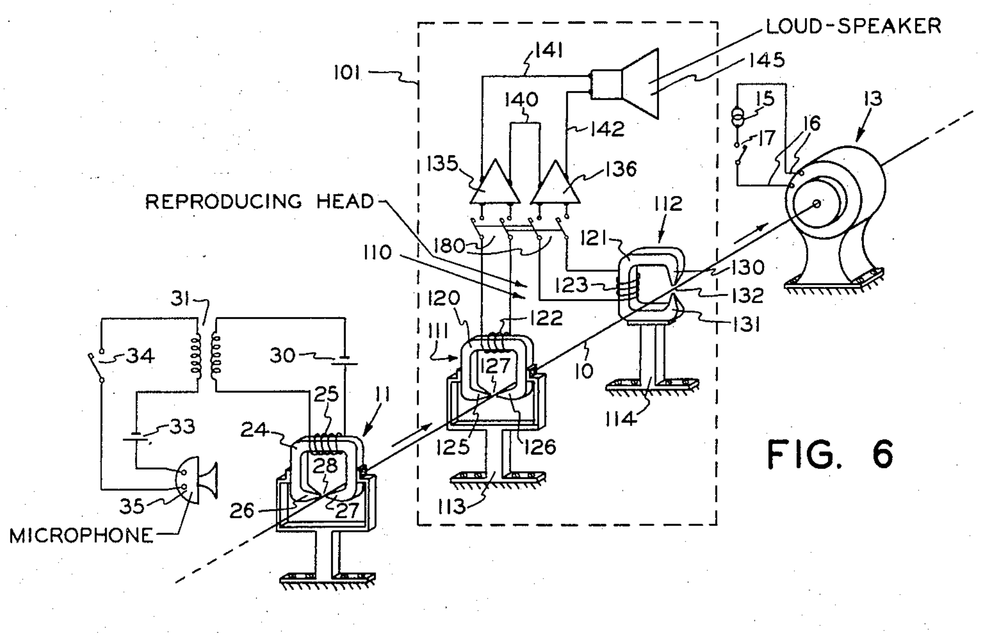
Fig. 6 shows a modified fragment of the arrangement of Fig. 1 in which the reproducer consists of two electromagnets differently oriented one with respect to the other and a single loud speaker is connected to said electromagnets.

Fig. 6 represents a modified fragment of Fig. 1 in which the reproducer 12, the two loud-speakers 87, 88 and all circuit elements included in the dotted enclosure 100 have been replaced by a novel arrangement designated in Fig. 6 by a dotted enclosure 101. All other elements working in conjunction with those included in dotted enclosure 101, are common to both arrangements of Fig. 1 and Fig. 6. These common elements are, for instance, supporting base 1, bearing members 2, spools 3, 4, guide members 5, 6, wire 10, motor 9, recording head 11, erasing head 13 and all other elements shown in Fig. 1 with the exception of those included in the dotted enclosure 100.

Consider now the novel elements shown in Fig. 6 and included in the dotted enclosure 101. These include the reproducing head 110 which consists essentially of two electromagnets 111 and 112 mounted upon supports 113, 114, respectively. The electromagnets 111, 112 have iron cores 120, 121 and windings 122, 123 wound around the cores 120, 121, respectively. The core 120 is provided with two pole pieces 125, 126, forming an air gap 127 and the core 121 is provided with two pole pieces 130, 131 forming an air gap 132. The wire 10 is made to pass through the air gaps 127 and 132. As shown in Fig. 6 the iron cores 120, 121 are fixedly mounted upon the supports 113, 114, respectively, and differently oriented one with respect to another. The iron core 120 is so oriented that the line joining the pole pieces 125, 126 is perpendicular to the axis of the wire and is located in the horizontal plane. The iron core 121 is so oriented that the line joining the pole pieces 130, 131 is perpendicular to the axis of the wire and is located in the vertical plane. The outputs of windings 122, 123 are connected to amplifiers 135, 136, respectively. The amplifiers 135, 136 have a common output terminal 140 and have the two remaining output terminals 141, 142 connected to a loud-speaker 145.

It is apparent that each of the electromagnets 111, 112 is structurally identical to the electromagnet 24, and, consequently, the front view and the two cross sectional views shown in Fig. 2 can be used to represent each of electromagnets 111, 112 as well as electromagnet 24.

Fig. 6 shows an arrangement in which the two reproducing electromagnets are arranged to pick up the recorded signals at slightly different times. The electromagnets 111 and 112 are spaced one from another in a manner such that electromagnet 111 picks up the signals first and electromagnet 112 picks up the same signal after a slight delay. It is well known that sounds are identified not so much by the wave shape of the air pressure waves but by their spectral composition. In connection with various attempts to simulate reverberatory effects for sounds recorded on phonographic discs and other recording media, two reproducing devices spaced one from another so as to pick up the recorded signals with a slight intervening delay have been employed. As early as 1926 the French corporation "Pathe Freres" employed a phonographic disc reproducer embodying two pick-up heads spaced one from another by about 1 centimeter which responded to a time delay of about 1/40 of a second. This spacing and corresponding time delay could be varied and it was found that time delays up to about 1/10 second were permissible. In the arrangement of Fig. 6 the electromagnets 111 and 112 are preferably arranged so that the time delay is of the order of 1/40 of a second. The electromagnets are differently oriented in such a manner that the electromagnet 111 picks up the component of the magnetism that is horizontal and the other electromagnet 112 picks up the component of the magnetism that is vertical. In an arrangement as described it is impossible for the ordinary wave shapes encountered in speech and music for the signals picked up by electromagnet 111 to completely cancel the signals picked up by electromagnet 112 because at no time are the two signals identical since one is delayed from the other by very many wave lengths. Such cancellation could occur only for comparatively pure sinusoids, but since the wave shapes encountered in music, and particularly those encountered in speech consist of rapidly changing signals, it is in practice impossible for a signal occurring at a given time to be completely cancelled by a signal occurring a few hundredths of a second later. Consequently, the electrical voltages derived from the outputs of the amplifiers 135, 136 never cancel each other and the sum of these two voltages is applied to the loud-speaker 145. Thus, the signal heard over the loud-speaker 145 in the arrangement of Fig. 6 merely has the characteristics of a signal that would be picked up by a single reproducing head in a room having a long reverberation time and the contribution of a second reproducing head is similar to the contribution of the echoes that result in a room provided with hard walls.

Figure 7:
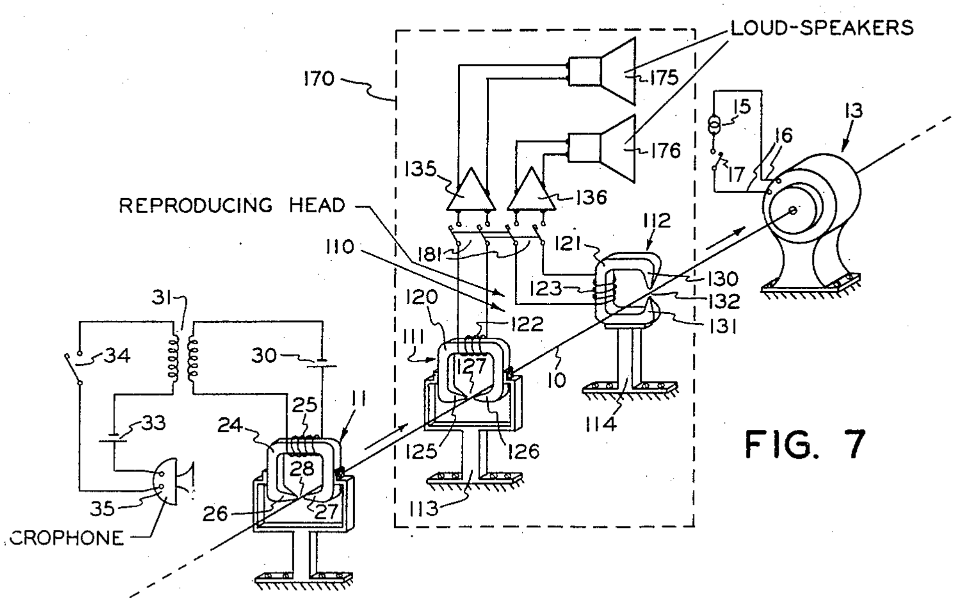
Fig. 7 shows another modified fragment of the arrangement of Fig. 1 in which the reproducer consists of two electromagnets differently oriented one with respect to the other and two loudspeakers are separately connected to said electromagnets.

Fig. 7 represents another modified fragment of Fig. 1 in which the reproducer 12, the two loud-speakers 87, 88 and all circuit elements included in the dotted enclosure 100 have been replaced by a novel arrangement designated in Fig. 7 by a dotted enclosure 170. The enclosure 170 comprises many elements in common with the enclosure 101 in Fig. 6 and all such common elements have been designated by the same numerals.

In the arrangement of Fig. 7 the electromagnet 111 picks up the component of the magnetism that is horizontal and the electromagnet 112 picks up the component of the magnetism that is vertical. The electromagnets translate the variations of magnetism into corresponding electrical currents and amplifier 135 is arranged to amplify the currents derived from the electromagnet 111 and amplifier 136 is arranged to amplify the currents derived from the electromagnet 112. Amplifier 135 is connected to a loud-speaker 175 and amplifier 136 is connected to a separate loud-speaker 176. It is apparent that power output of one of the loud-speakers always tends to increase the loudness of the total signal generated. The reason for this lies in the fact that (1) the loud-speakers themselves are usually of the same order of dimensions or larger than a wave length sound; (2) the spectral composition of sounds encountered in speech and music is extremely complex and if phase cancellation does exist for one frequency phase, addition will exist for another frequency so that the resultant effect of two sound generators causes merely a variation in the smoothness of the response vs. frequency characteristic of the system but does not result in any appreciable cancellation effects; (3) because of reverberations, etc. the ears of the listener receive the sound over a multiplicity of paths and at no time is it possible for all the paths to one loud-speaker to cancel the effects due to all the paths to the other loud-speaker. Thus, it is seen that by the present arrangement employing two loud-speakers the previous difficulties due to twisting of the wire are overcome since the arrangement employing two pick-up coil pairs and the dual loud-speakers makes it impossible for the signals caused by the components of the magnetism to cancel one another.

Having now particularly described and ascertained the nature of my said invention and in what manner the same is to be performed, I declare what I claim is:

1. The method of reproducing sound magnetically recorded upon a wire with the direction of magnetization transverse to the longitudinal axis of said wire and wherein the wire may twist so as to be oriented differently during the reproducing operation than during the recording operation, which comprises, converting the component of magnetization along one predetermined diameter of said wire to an electrical signal, converting the component of magnetization along a different predetermined diameter of said wire to a second electrical signal and separately converting said electrical signals to sound.

2. The method of reproducing sound magnetically recorded upon a wire with the direction of magnetization transverse to the longitudinal axis of said wire and wherein the wire may twist so as to be oriented differently during the reproducing operation than during the recording operation, which comprises, converting the component of magnetization along one predetermined diameter of said wire to an electrical signal, converting the component of magnetization along a different predetermined diameter of said wire in the same diametrical plane with said first diameter to a second electrical signal, and separately converting said electrical signals to sound.

3. The method of reproducing sound magnetically recorded upon a wire with the direction of magnetization transverse to the longitudinal axis of said wire and wherein the wire may twist so as to be oriented differently during the reproducing operation than during the recording operation, which comprises, converting the magnetization of said wire to a first electrical signal by means of a pick up unit located along an extension of one predetermined diameter of said wire, converting the magnetization of said wire to a second electrical signal by means of a pick up unit located along an extension of a different predetermined diameter of said wire with said second mentioned pick up unit displaced longitudinally of the wire relative to said first mentioned pick up unit, and separately converting said electrical signals to sound.

4. The method of reproducing sound magnetically recorded upon a wire with the direction of magnetization transverse to the longitudinal axis of said wire and wherein the wire may twist so as to be oriented differently during the reproducing operation than during the recording operation, which comprises, converting the magnetization of said wire to a first electrical signal by means of a pick up unit located along an extension of one predetermined diameter of said wire, converting the magnetization of said wire to a second electrical signal by means of a pick up unit located along an extension of a diameter of said wire disposed at right angles to said one diameter, and separately converting said electrical signals to sound.

5. In a reproducer for reproducing audio signals transversely magnetically recorded upon a moving wire moving in the direction of the longitudinal axis of said wire whereby the component of magnetic flux along different diameters of the same diametrical plane varies, said wire being capable of twisting about said longitudinal axis upon movement thereof, means responsive to the magnetization along one diameter of said wire for converting the component of magnetization along said diameter to a first electrical signal, means responsive to the magnetization along another diameter of said wire in approximately the same diametrical plane with said first diameter for converting the component of magnetization along said second diameter to a second electrical signal, and means responsive to each of said signals for converting said signals to sound.

6. In a reproducer for reproducing audio signals transversely magnetically recorded upon a moving wire moving in the direction of a longitudinal axis of said wire whereby the component of magnetic flux along different diameters of the same diametrical plane varies, said wire being capable of twisting about said longitudinal axis upon movement thereof, means responsive to the magnetization along one diameter of said wire for converting the component of magnetization along said diameter to a first electrical signal, means responsive to the magnetization along another diameter of said wire in a diametrical plane displaced longitudinally of said wire with respect to the diametrical plane containing said first diameter for converting the component of magnetization along said second diameter to a second electrical signal, and means responsive to each of said signals for converting said signals to sound.

7. In a reproducer for reproducing audio signals transversely magnetically recorded upon a moving wire moving in the direction of the longitudinal axis of said wire whereby the component of magnetic flux along different diameters of the same diametrical plane varies, said wire being capable of twisting about said longitudinal axis upon movement thereof, means responsive to the magnetization along one diameter of said wire for converting the component of magnetization along said diameter to a first electrical signal, means responsive to the magnetization along another diameter of said wire for converting the component of magnetization along said second diameter to a second electrical signal, said two diameters being displaced from each other by ninety degrees and means responsive to each of said signals for converting said signals to sound.

JACOB NEUFELD.

REFERENCES CITED

The following references are of record in the file of this patent:

UNITED STATES PATENTS

| Number | Name | Date |
| --- | --- | --- |
| 873,083 | Poulsen | Dec. 10, 1907 |
| 1,949,409 | Cohen | Mar. 6, 1934 |
| 2,272,821 | Roys | Feb. 10, 1942 |

FOREIGN PATENTS

| Number | Country | Date |
| --- | --- | --- |
| 593,565 | Germany | Feb. 28, 1934 |